(12) United States Patent
Guo et al.

(10) Patent No.: US 9,575,206 B2
(45) Date of Patent: Feb. 21, 2017

(54) DOWNHOLE EVALUATION WITH NEUTRON ACTIVATION MEASUREMENT

(71) Applicant: HALLIBURTON ENERGY SERVICES, INC., Houston, TX (US)

(72) Inventors: Weijun Guo, Houston, TX (US); Daniel Francois Dorffer, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/439,649

(22) PCT Filed: Apr. 28, 2014

(86) PCT No.: PCT/US2014/035724
§ 371 (c)(1),
(2) Date: Apr. 29, 2015

(87) PCT Pub. No.: WO2015/167433
PCT Pub. Date: Nov. 5, 2015

(65) Prior Publication Data
US 2016/0238736 A1    Aug. 18, 2016

(51) Int. Cl.
*G01V 5/08* (2006.01)
*G01V 5/10* (2006.01)
(Continued)

(52) U.S. Cl.
CPC ............ *G01V 5/101* (2013.01); *C04B 28/02* (2013.01); *C09K 8/467* (2013.01); *E21B 47/00* (2013.01); *E21B 47/0005* (2013.01)

(58) Field of Classification Search
CPC ....................................... G01V 5/101
See application file for complete search history.

(56) References Cited

U.S. PATENT DOCUMENTS

| | | |
|---|---|---|
| 2,231,577 A | 2/1941 | Hare |
| 3,081,401 A | 3/1963 | Wilson |
| | (Continued) | |

FOREIGN PATENT DOCUMENTS

| | | |
|---|---|---|
| EP | 0443936 | 8/1991 |
| EP | 2426516 | 3/2012 |
| | (Continued) | |

OTHER PUBLICATIONS

"Heavy Crude Oil", Wikipedia, last modified Jun. 12, 2015, retrieved from internet on Jun. 22, 2015, https://en.wikipedia.org/w/index.php?title=Heavy_crude_oil&oldid=666596324, 5 pages.

(Continued)

*Primary Examiner* — Kiho Kim
(74) *Attorney, Agent, or Firm* — Benjamin Fite; Parker Justiss, P.C.

(57) ABSTRACT

Neutron activation measurement techniques may be used to evaluate various properties of a subterranean well structure. In an example implementation, a logging tool can be positioned within a wellbore, such that neutrons generated by a neutron source are directed towards well structure. In response to the neutrons, the well structure emits gamma rays. A portion of the gamma rays can be detected by a gamma detector. To enhance the well structure's response to neutron activation, the well structure can be constructed of materials that include one or more doping materials. The inclusion of these doping materials can increase the number of gamma rays that are emitted when neutrons are directed into the well structure, and these emitted gamma rays can be more easily identified based on their energy level.

35 Claims, 10 Drawing Sheets

(51) Int. Cl.
*E21B 47/00* (2012.01)
*C09K 8/467* (2006.01)
*C04B 28/02* (2006.01)

(56) References Cited

U.S. PATENT DOCUMENTS

| | | | |
|---|---|---|---|
| 4,028,546 | A | 6/1977 | Peelman et al. |
| 4,122,341 | A | 10/1978 | Smith, Jr. |
| 4,129,777 | A | 12/1978 | Wahl et al. |
| 5,001,342 | A | 3/1991 | Rambow |
| 5,578,820 | A | 11/1996 | Gadeken et al. |
| 5,783,822 | A | 7/1998 | Buchanan et al. |
| 8,346,481 | B2 | 1/2013 | Jacobson et al. |
| 2002/0014583 | A1 | 2/2002 | Bothner |
| 2008/0156977 | A1 | 7/2008 | Jeffryes |
| 2008/0308720 | A1* | 12/2008 | Ferguson ............... G01V 5/101 250/269.6 |
| 2009/0090505 | A1* | 4/2009 | McDaniel ........... E21B 47/1015 166/250.1 |
| 2010/0224773 | A1 | 9/2010 | Galford et al. |
| 2011/0137566 | A1 | 6/2011 | Jacobson et al. |
| 2011/0202276 | A1 | 8/2011 | Truax et al. |
| 2011/0257948 | A1 | 10/2011 | McDaniel |
| 2012/0016588 | A1 | 1/2012 | Evans et al. |
| 2012/0068060 | A1 | 3/2012 | Chace et al. |
| 2012/0075953 | A1 | 3/2012 | Chace et al. |
| 2012/0091329 | A1 | 4/2012 | Chace et al. |
| 2013/0048849 | A1 | 2/2013 | Li et al. |

FOREIGN PATENT DOCUMENTS

| | | |
|---|---|---|
| WO | WO2010/123494 | 10/2010 |
| WO | WO2013/012504 | 1/2013 |

OTHER PUBLICATIONS

"Light Crude Oil", Wikipedia, last modified Sep. 13, 2014, retrieved from internet on Jun. 22, 2015, https://en.wikipedia.org/w/index.php?title=Light_crude_oil&oldid=625430646, 3 pages.

Anderson et al., "Acoustic Cement Bond Logging," Society of Petrophysicists and Well-Log Analysts., 1961, 15 pages.

KIPO ISA; International Search Report and Written Opinion for PCT/US2014/035724, mailed Apr. 28, 2014, 19 pages.

Baker Hughes, "Reservoir Performance Monitor (RPM)," 30103 T, © 2010, 8 pages.

Haines et al., "Downhole Data Captured," Oil and Gas Investor an Investor guide, Hart Energy Publishing LP, Aug. 21, 2006, 4 pages.

Halliburton, "Reservoir Monitor Tool Elite (RMT-E™)," D00132943, © 2003, 2 pages.

Halliburton, "RMT Elite™ Reservoir Monitor Tool," H02621, Jan. 2008, 4 pages.

Halliburton, "Thermal Multigate Decay-Lithology (TMD-L™)," H01190, Jan. 2008, 2 pages.

Halliburton, "TMD3D™ (Thermal Multigate Decay—3 Detector) Logging Tool," H09044, Jul. 2012, 2 pages.

North et al., "Through-Casing Reservoir Evaluation Using Gamma Ray Spectroscopy", SPE 16356, Society of Petroleum Engineers of AIME, Apr. 8-10, 1987, 14 pages.

Prensky et al., "What's new in well logging and formation evaluation," Petrophysical Technology, World Oil, vol. 232, No. 6, Jun. 2011, 8 pages.

Schlumberger, "RSTPro," 06-PR-001, Jul. 2006, 8 pages.

Weatherford®, "Pulsed Neutron Decay (PND®) Spectrum Tool," 3730.03, © 2006-2011, 2 pages.

\* cited by examiner

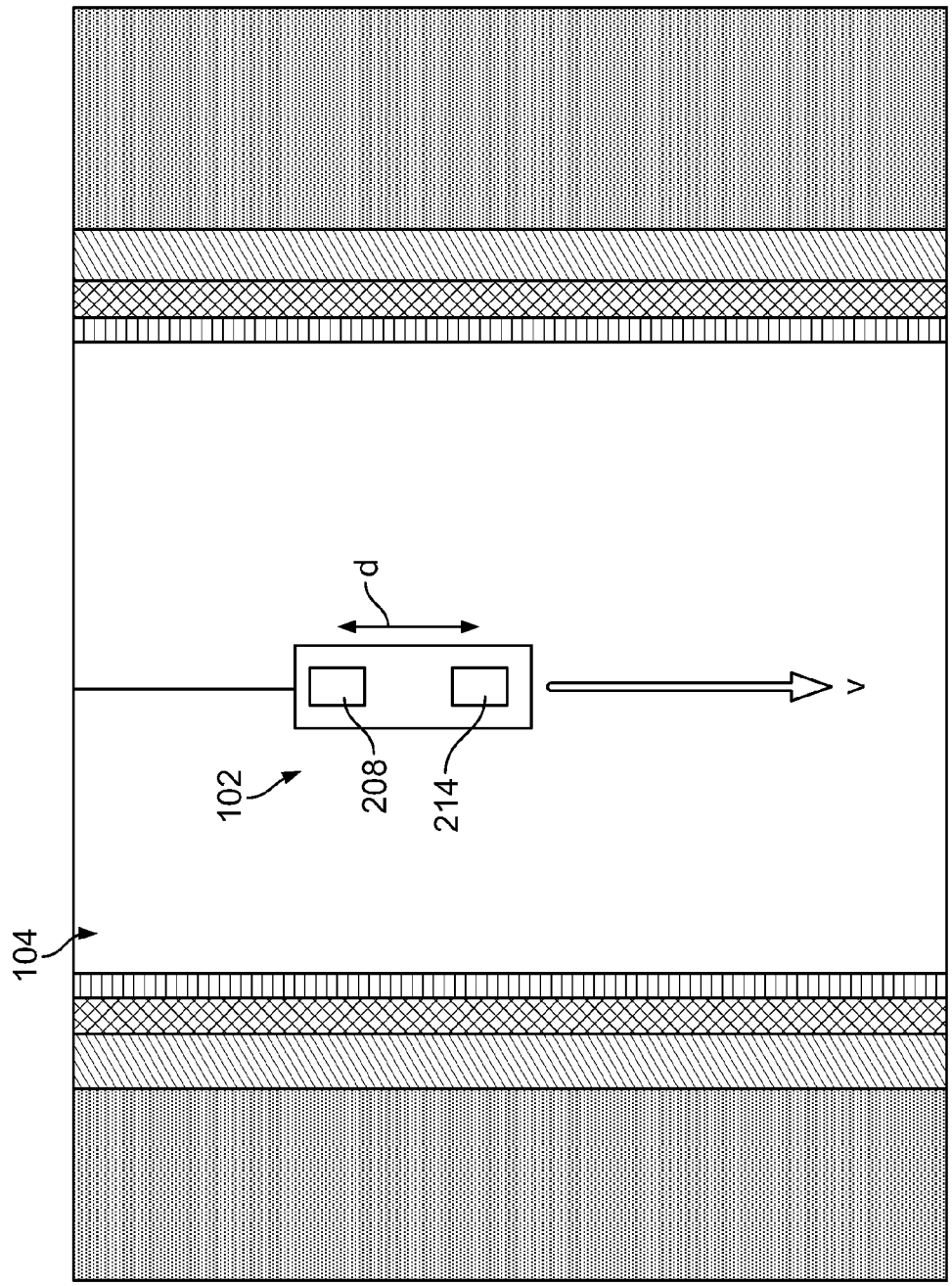

DOWNHOLE EVALUATION WITH NEUTRON ACTIVATION MEASUREMENT

CLAIM OF PRIORITY

This application is a U.S. National Stage of International Application No. PCT/US/2014/035724, filed Apr. 28, 2014.

TECHNICAL FIELD

This disclosure relates generally to well logging, and more particularly to evaluating structures of a well using neutron activation measurement techniques.

BACKGROUND

In the field of logging (e.g., wireline logging, logging while drilling (LWD) and measurement while drilling (MWD)), various techniques can be used to identify a variety of characteristics of a subterranean well structure and the surrounding earth formations. In some examples, well logging can be conducted by sound, electrical current, electromagnetic waves, or high energy nuclear particles (e.g., gamma particles and neutrons). In an example usage, well logging can be used to evaluate the quality or integrity of a well structure. The accuracy of this determination is not only important for correctly assessing the quality of construction of a well, but also is critical in identifying well damage during the course of oilfield operations. These assessments are essential to the safety and economy of these operations.

DESCRIPTION OF DRAWINGS

FIG. 8 is a diagram of an example relationship between the velocity of a logging tool and example factors.

Like reference symbols in the various drawings indicate like elements.

DETAILED DESCRIPTION

Figure 1A:
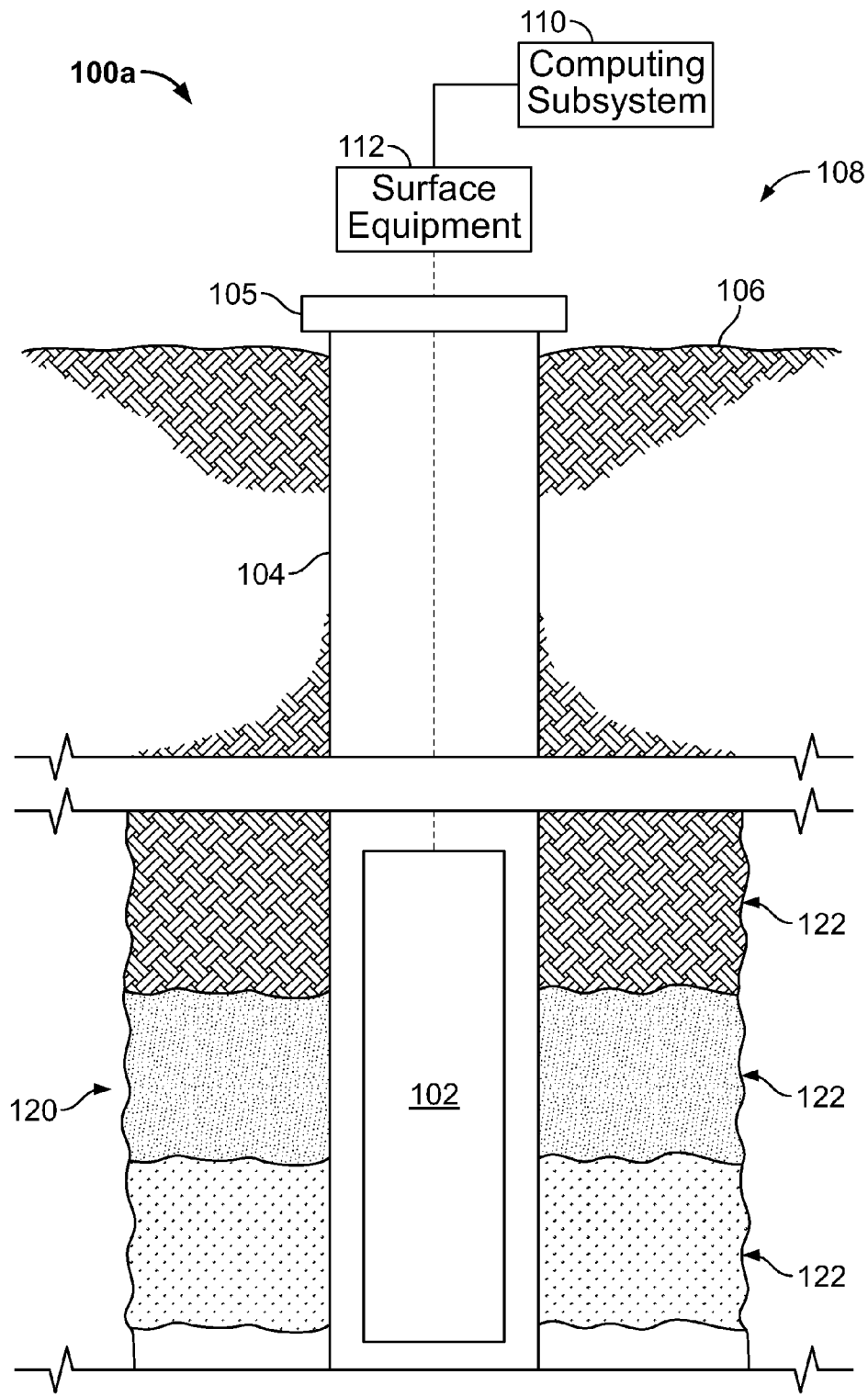
FIG. 1A is a diagram of an example well system.

FIG. 1A is a diagram of an example well system 100a. The example well system 100a includes a logging system 108 and a subterranean region 120 beneath the ground surface 106. A well system can include additional or different features that are not shown in FIG. 1A. For example, the well system 100a may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrated through the subsurface layers 122. The subsurface layers 122 can include sedimentary layers, rock layers, sand layers, or combinations of these and other types of subsurface layers. One or more of the subsurface layers can contain fluids, such as brine, oil, gas, etc. Although the example wellbore 104 shown in FIG. 1A is a vertical wellbore, the logging system 108 can be implemented in other wellbore orientations. For example, the logging system 108 may be adapted for horizontal wellbores, slant wellbores, curved wellbores, vertical wellbores, or combinations of these.

The logging system 108 includes a logging tool 102, surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, for example, near the well head 105, to control the logging tool 102 and possibly other downhole equipment or other components of the well system 100. The example computing subsystem 110 can receive and analyze logging data from the logging tool 102. A logging system can include additional or different features, and the features of a logging system can be arranged and operated as represented in FIG. 1A or in another manner.

In some instances, all or part of the computing subsystem 110 can be implemented as a component of, or can be integrated with one or more components of, the surface equipment 112, the logging tool 102 or both. In some cases, the computing subsystem 110 can be implemented as one or more computing structures separate from the surface equipment 112 and the logging tool 102.

In some implementations, the computing subsystem 110 is embedded in the logging tool 102, and the computing subsystem 110 and the logging tool 102 can operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102.

The well system 100a can include communication or telemetry equipment that allow communication among the computing subsystem 110, the logging tool 102, and other components of the logging system 108. For example, the components of the logging system 108 can each include one or more transceivers or similar apparatus for wired or wireless data communication among the various components. For example, the logging system 108 can include systems and apparatus for wireline telemetry, wired pipe telemetry, mud pulse telemetry, acoustic telemetry, electromagnetic telemetry, or a combination of these and other types of telemetry. In some cases, the logging tool 102 receives commands, status signals, or other types of information from the computing subsystem 110 or another source. In some cases, the computing subsystem 110 receives logging data, status signals, or other types of information from the logging tool 102 or another source.

Logging operations can be performed in connection with various types of downhole operations at various stages in the lifetime of a well system. Structural attributes and components of the surface equipment 112 and logging tool 102 can be adapted for various types of logging operations. For example, logging may be performed during drilling operations, during wireline logging operations, or in other contexts. As such, the surface equipment 112 and the logging tool 102 may include, or may operate in connection with drilling equipment, wireline logging equipment, or other equipment for other types of operations.

Figure 1B:
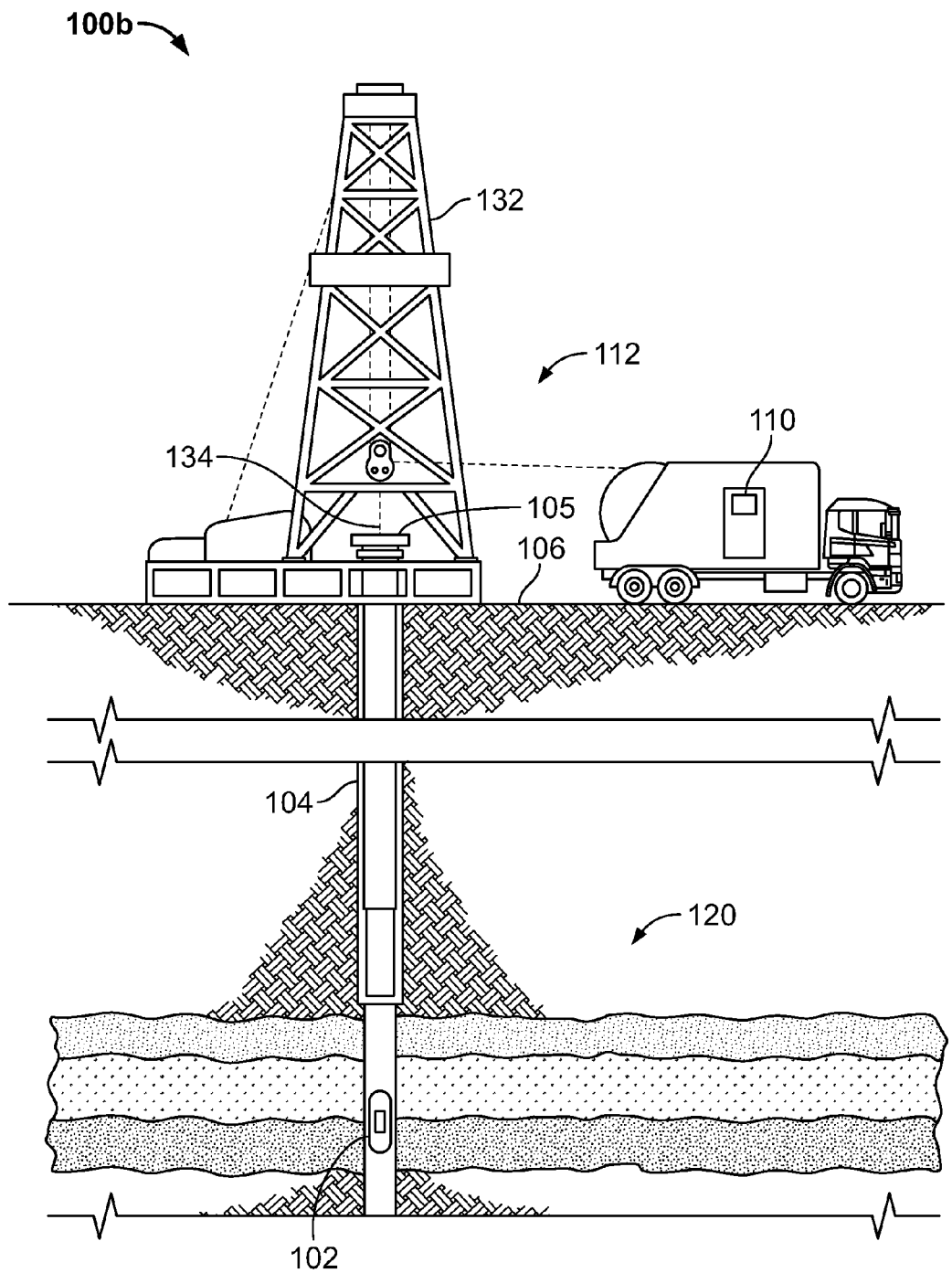
FIG. 1B is a diagram of an example well system that includes a logging tool in a wireline logging environment.

In some examples, logging operations are performed during wireline logging operations. FIG. 1B shows an example well system 100b that includes the logging tool 102 in a wireline logging environment. In some example wireline logging operations, the surface equipment 112 includes a platform above the surface 106 equipped with a derrick 132 that supports a wireline cable 134 that extends into the wellbore 104. Wireline logging operations can be performed, for example, after a drill string is removed from the wellbore 104, to allow the wireline logging tool 102 to be lowered by wireline or logging cable into the wellbore 104.

Figure 1C:
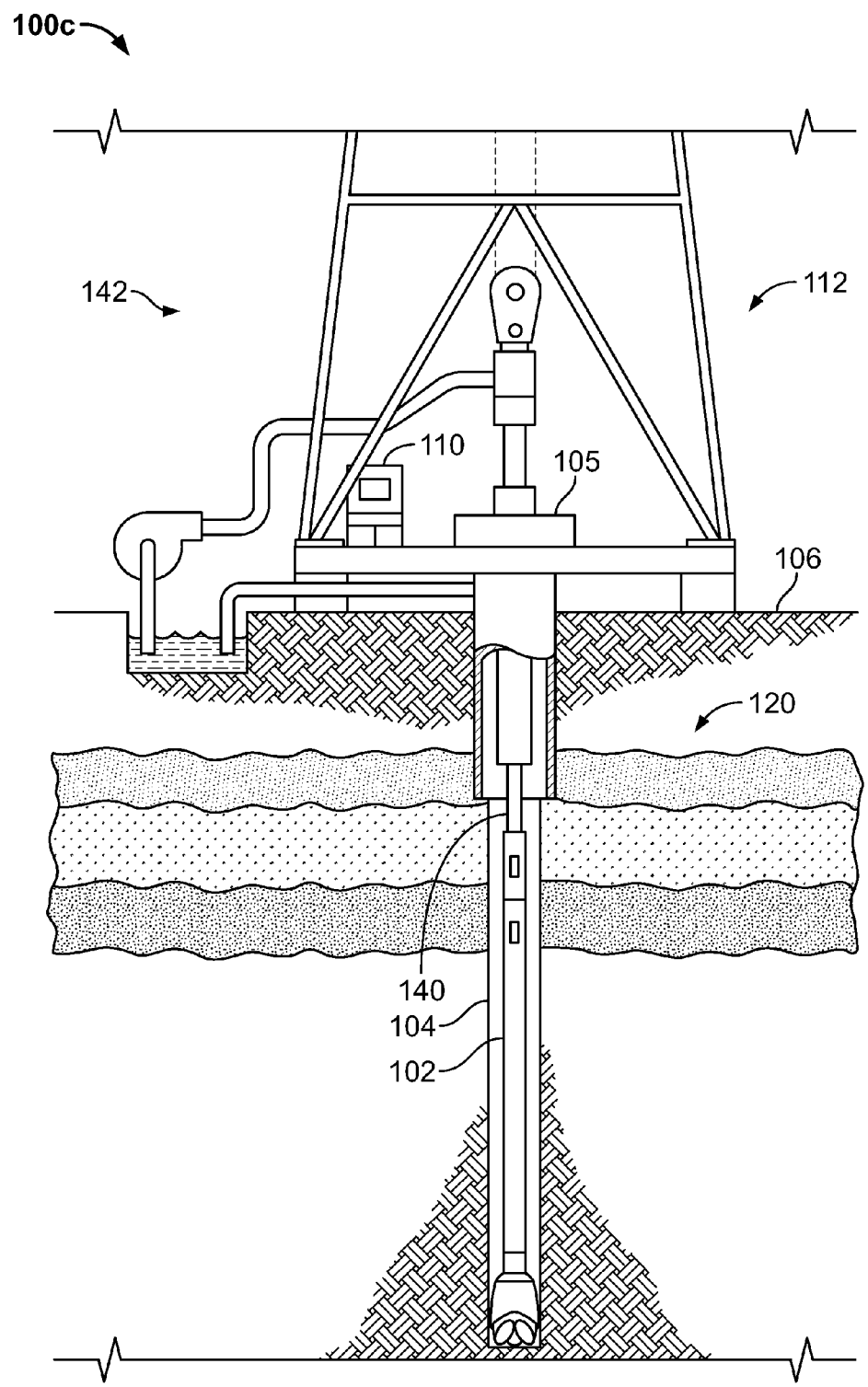
FIG. 1C is a diagram of an example well system that includes a logging tool in a logging while drilling (LWD) environment.

In some examples, logging operations are performed during drilling operations. FIG. 1C shows an example well system 100c that includes the logging tool 102 in a logging while drilling (LWD) environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill a wellbore penetrating the subterranean region 120. The drill string 140 may include, for example, a kelly, drill pipe, a bottom hole assembly, and other components. The bottom hole assembly on the drill string may include drill collars, drill bits, the logging tool 102, and other components. The logging tools may include measuring while drilling (MWD) tools, LWD tools, and others.

In some example implementations, the logging tool 102 includes an tool for obtaining measurements from the subterranean region 120. As shown, for example, in FIG. 1B, the logging tool 102 can be suspended in the wellbore 104 by a coiled tubing, wireline cable, logging string, or another structure that connects the tool (either alone or in conjunction with other tools) to a surface control unit or other components of the surface equipment 112. In some example implementations, the logging tool 102 is lowered to the bottom of a region of interest and subsequently pulled upward (e.g., at a substantially constant speed) through the region of interest. As shown, for example, in FIG. 1C, the logging tool 102 can be deployed in the wellbore 104 on jointed drill pipe, hard wired drill pipe, or other deployment hardware. In some example implementations, the logging tool 102 collects data during drilling operations as it moves downward through the region of interest. In some example implementations, the logging tool 102 collects data while the drill string 140 is moving, for example, while it is being tripped in or tripped out of the wellbore 104.

In some example implementations, the logging tool 102 collects data at discrete logging points in the wellbore 104. For example, the logging tool 102 can move upward or downward incrementally to each logging point at a series of depths in the wellbore 104. At each logging point, instruments in the logging tool 102 perform measurements on the subterranean region 120. The measurement data can be communicated to the computing subsystem 110 for storage, processing, and analysis. Such data may be gathered and analyzed during drilling operations (e.g., during logging while drilling (LWD) operations), during wireline logging operations, or during other types of activities.

The computing subsystem 110 can receive and analyze the measurement data from the logging tool 102 to detect properties of various subsurface layers 122 or structures of well system 100 (e.g., downhole casing positioned within wellbore 104). For example, the computing subsystem 110 can identify the density, material content, or other properties of the subsurface layers 122 or structures of well system 100 based on the measurements acquired by the logging tool 102 in the wellbore 104.

Figure 2:
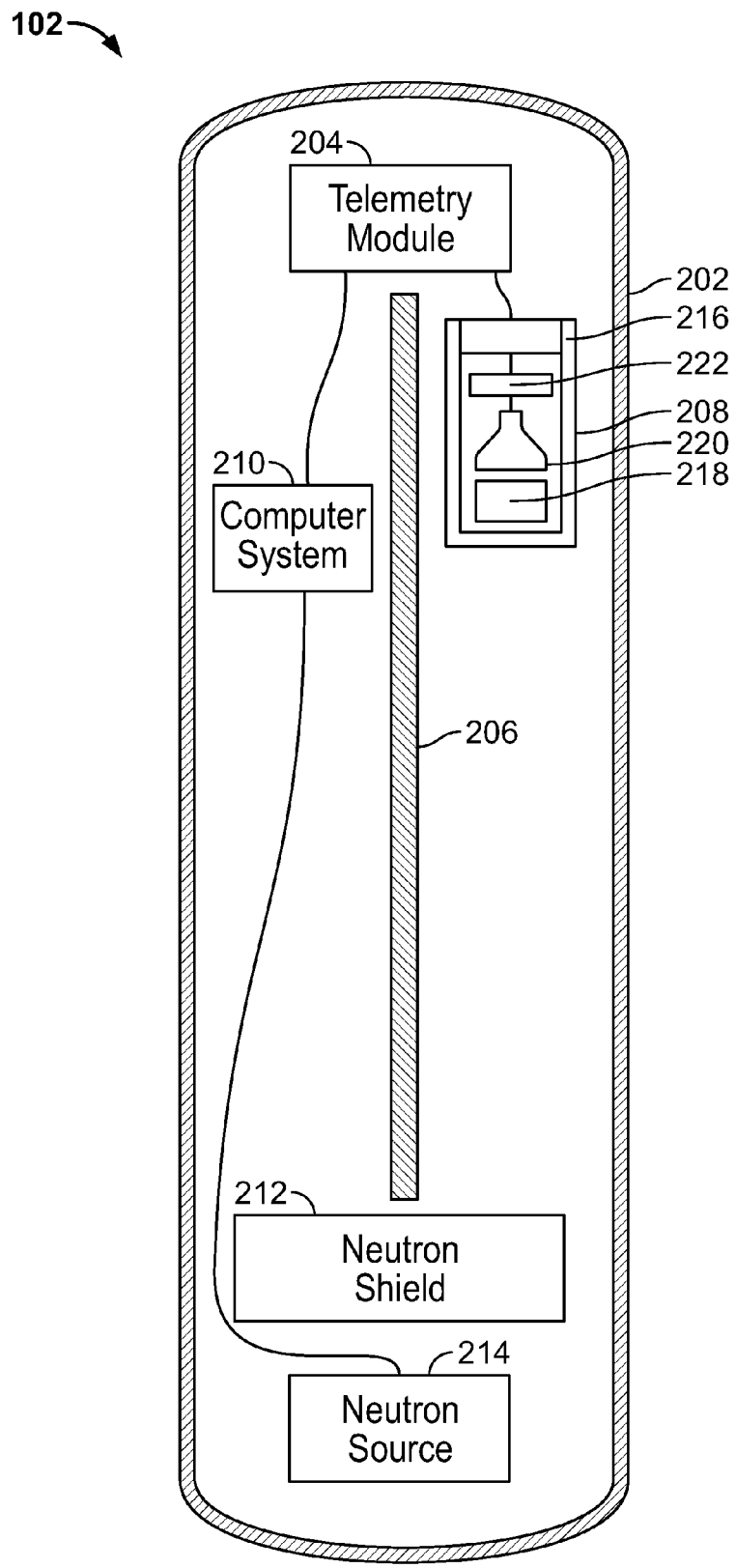
FIG. 2 is a diagram of an example logging tool.

In some implementations, the logging system 108 includes a nuclear logging system. FIG. 2 shows a simplified cross-sectional view of an example nuclear logging tool 102 used with a nuclear logging system. Logging tool 102 includes a pressure vessel 202 that houses various components, such as a telemetry module 204, borehole shield 206, a gamma detector 208, a computing system 210, a neutron shield 212, and a neutron source 214.

Pressure vessel 202 may vary in size and shape in order to accommodate particular applications and to support various component dimensions and layouts. For example, in some implementations, pressure vessel 202 is generally tubular. The dimensions of the vessel 202 can vary. For example, in some implementations, the pressure vessel 202 has an outer diameter of approximately 3⅝". In another example, the vessel 202 has an outer diameter of approximately 1¹¹⁄₁₆". The inner diameter of vessel 202, and correspondingly the thickness of vessel 202, can also vary. In some embodiments, vessel has an inner diameter of approximately ³⁄₁₆" or ⅜". In general, the inner and outer diameters of vessel 202 may be varied to provide a particular pressure rating for the housing (e.g., a pressure rating of 15-40 kpsi).

Components of logging tool 102 are contained within pressure vessel 202, including telemetry module 204, borehole shield 206, gamma detector 208, computer system 210, a neutron shield 212, and a neutron source 214. Computer system 210 can be used to control one or more components of logging tool 102 (e.g., control the operation of gamma detector 208, neutron source 214, and telemetry module 204), and/or analyze measurement information collected by logging tool 102.

In general, gamma detector 208 is placed sufficiently far from neutron source 214 in order to reduce neutron exposure to gamma detector 208, and sufficiently close to neutron source 214 to ensure that the gamma detector 208 is able to detect a sufficient number of gammas in order to produce a reliable measurement. For instance, gamma detector 208 may be in a range from about 1 inch to about 72 inches from neutron source 214 (e.g., approximately 1-2 inches, 2-8 inches, 8-16 inches, 16-26 inches, 26-48 inches, 48-72 inches from neutron source 214).

In some implementations, the neutron source 214 is a deuterium/tritium neutron generator. However, any neutron source capable of producing and/or releasing neutrons with sufficient energy (e.g., greater than 8 Mega-Electron Volt (MeV)) may be used, for example an americium-beryllium (AmBe) source, a californium-252 (Cf-252) source, or a 14 MeV neutron source from a pulsed-neutron generator (PNG). The neutron source 214, under command from surface computing subsystem 110 and/or computer system 206 within the tool 102, generates and/or releases energetic neutrons. In order to reduce the neutron exposure of the gamma detector 208 and other devices by energetic neutrons from the neutron source 214, neutron shield 212 (e.g., a suitable metal, such as tungsten, or a suitable alloy, such as HEVIMET®) separates the neutron source 214 from the gamma detector 208, and may span either all or part of an interior cross section of housing 202. Because of the speed of the energetic neutrons (e.g., 30,000 kilometers/second or more), and because of collisions of the neutrons with atomic nuclei that change the direction of movement of the neutrons, a neutron flux is created around the logging tool 102 that extends into the surrounding environment.

Neutrons generated and/or released by the source 214 interact with atoms by way of inelastic collisions and/or thermal capture, and cause the atoms to emit activation gamma rays. These activation gamma rays can be inelastic gamma rays, prompt gamma rays, or delayed gamma rays.

In some cases, when a neutron inelastically collides with atomic nuclei, a gamma ray is created (i.e., an inelastic gamma ray), and the energy of the neutron is reduced. The neutron may have many inelastic collisions with the atomic nuclei, each time creating an inelastic gamma ray and losing energy. At least some of the gammas rays created by the inelastic collisions are incident upon the gamma detectors 208.

Figure 3:
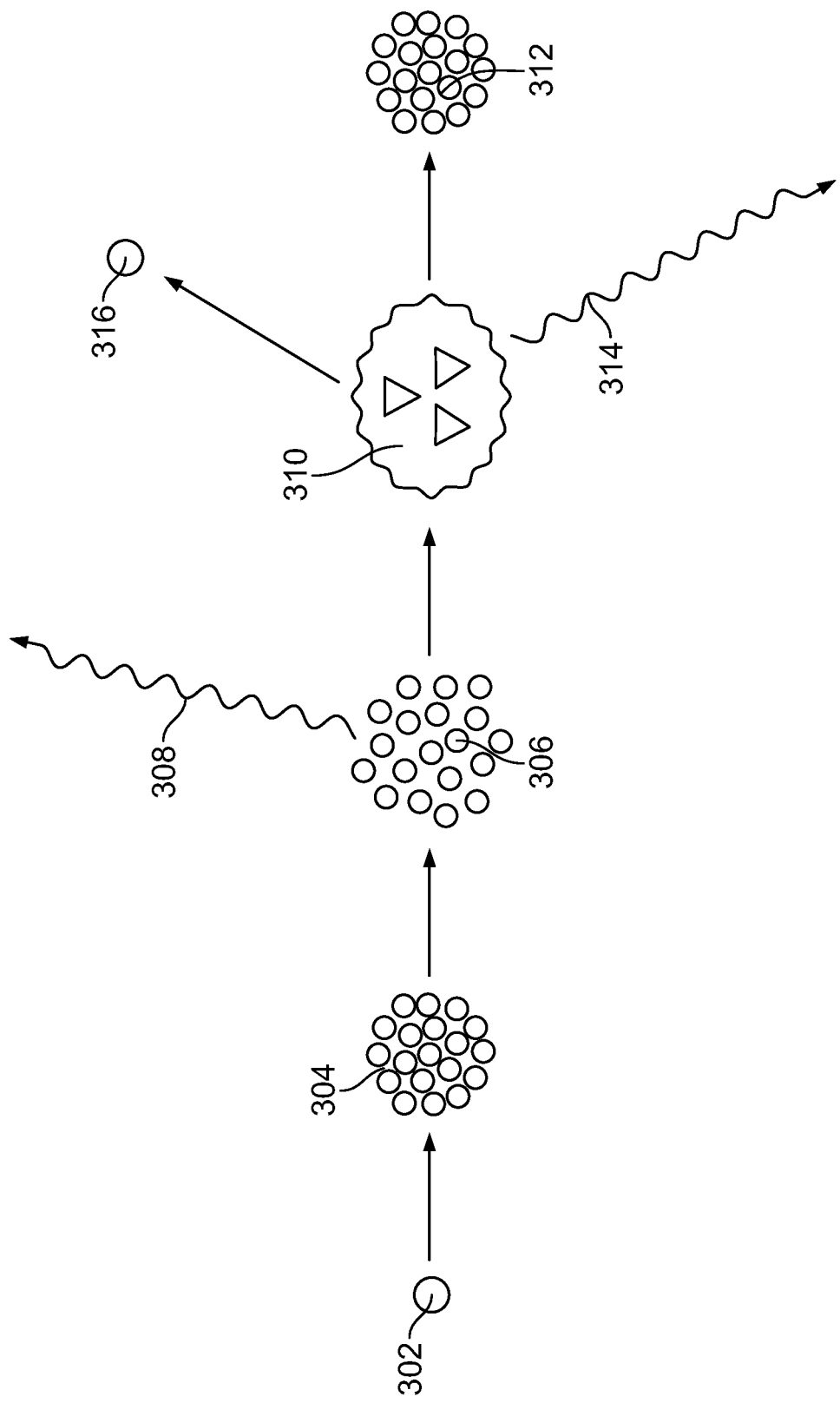
FIG. 3 is a diagram of a neutron activation process.

Referring to FIG. 3, after one or more inelastic collisions (and corresponding loss of energy) a neutron reaches an energy known as thermal energy, and becomes a thermal neutron 302. At thermal energy, a neutron can be captured by a target nucleus 304, in a process known as "neutron activation." In a capture event, the capturing targeting nucleus 304 compound nuclear 306 and enters an excited state. The excited compound nucleus 306 will almost instantaneously de-excite into a more stable configuration through emission of one or more characteristic prompt gamma rays 308. In many cases, this new configuration yields a radioactive nucleus 310 which also de-excites (or decays) into a product nucleus 312 by emission of one or more characteristic delayed gamma rays 314 and beta particles 316, but at a much slower rate according to the unique half-life of the radioactive nucleus 310. Depending upon the particular radioactive species, half-lives can range from fractions of a second to several years. At least some of the prompt gamma rays 308 and delayed gamma rays 314 gamma rays created by thermal capture are also incident upon the gamma detector 208.

In general, inelastic gamma rays, prompt gamma rays, and delayed gamma rays are characteristic. That is, their energy identifies the source element and the isotope, while their intensities are proportional to their quantities. Further, inelastic gamma rays and prompt gamma rays tend to be emitted nearly instantaneously after interaction with neutrons, while delayed gamma rays can be emitted for an extended prior of time after activation. Accordingly, in some implementations, the arrival time of a particular gamma ray and/or its energy may be used to determine status as an inelastic gamma ray, prompt gamma ray, or delayed gamma ray.

Referring to back to FIG. 2, when operational, the gamma detector 208 detects the arrival and energy of gamma rays. The gamma detector 208 includes an enclosure 216. Enclosure 216 encloses a crystal 218 (e.g., a yttrium/gadolinium silicate scintillation crystal, sodium iodide scintillation crystal, lanthanum bromide scintillation crystal, or a bismuth germinate (BGO) scintillation crystal), a photo multiplier tube 220 coupled to the crystal 218, and a processor 222 coupled to the photomultiplier tube 220. As gamma rays are incident upon/within the crystal 218, the gamma rays interact with the crystal 218 and flashes of light are emitted. Each flash of light itself is indicative of an arrival of a gamma ray, and the intensity of light is indicative of the energy of the gamma ray. The output of the photomultiplier tube 220 is proportional to the intensity of the light associated with each gamma ray arrival, and the processor 222 quantifies the output as gamma energy and relays this measurement information to the surface computing subsystem 110 or computer system 210 for further processing. In some implementations, the measurement information is relayed to the surface computing subsystem 110 by way of the telemetry module 204 and/or to the computer system 210 within the tool, and the computer subsystem 110 analyzes the measurement information in order to estimate the properties of the downhole environment (e.g., to detect properties of various subsurface layers 122 or structures of well system 100). In some implementations, computer system 210 of logging tool 104 can be used in conjunction with telemetry module 204 (e.g., to process data prior to transmission by telemetry module 204), or in conjunction with computer system 210 (e.g., to analyze the measurement data in conjunction with computing subsystem 110). In some implementations, computer system 210 can process measurement data independently from computer system 210 (e.g., instead of computer system 210 or in parallel with computer system 210) in order to estimate properties of the downhole environment.

In general, crystals 218 may vary in dimension based on the dimensions of tool 102, the arrangement and dimensions of the components of tool 102, and the desired detection sensitivity of gamma detectors 208. For instance, in some embodiments, crystals 218 have a detection face that is approximately 1 inch by 6 inches. In some embodiments, crystals 218 have a detection face that is approximately 1 inch by 1 inch. While example dimensions are given above, crystal 218 can have a detection face of any suitable dimension, for instance greater than 1 inch by 1 inch, or smaller than 1 inch by 1 inch.

Figure 4:
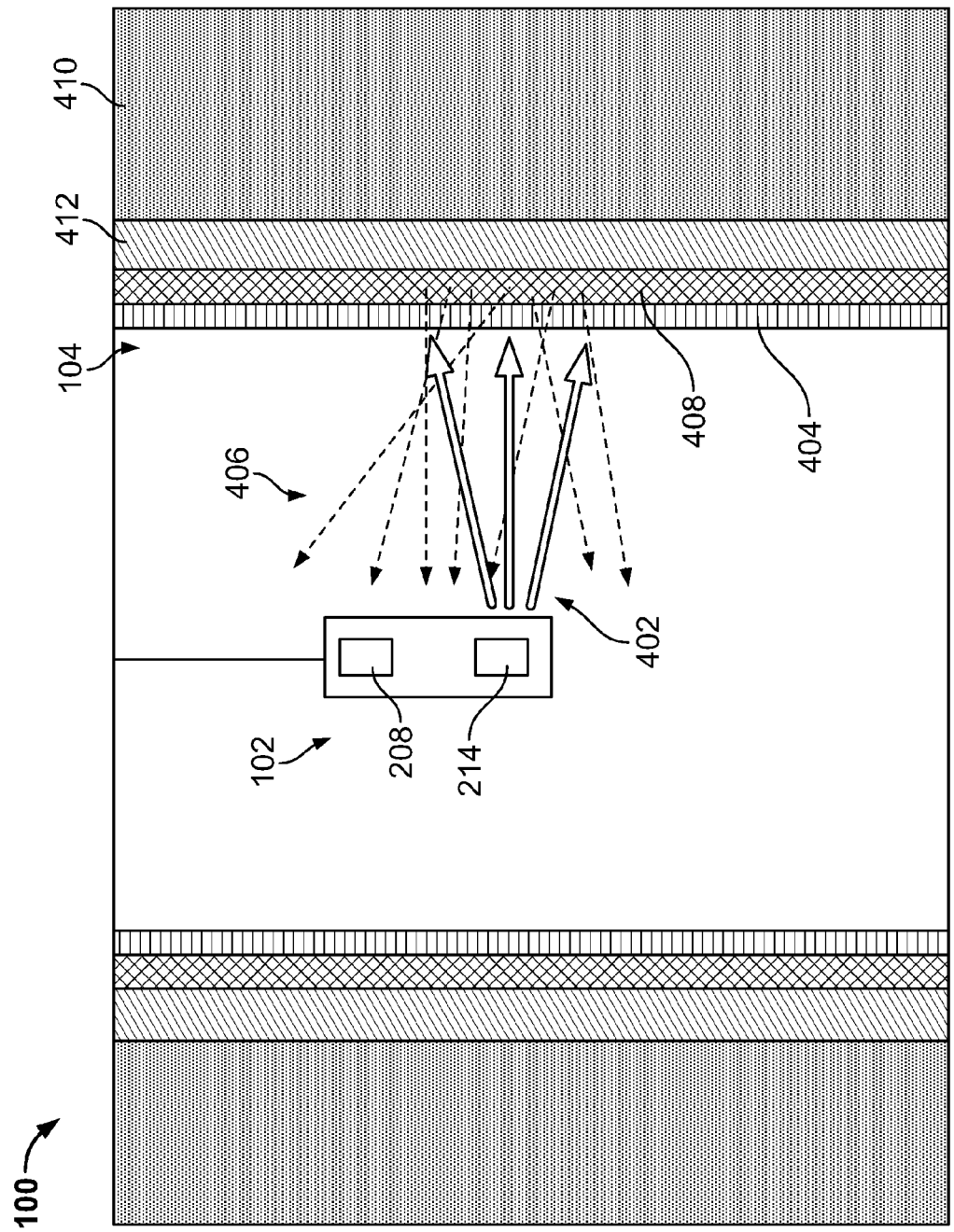
FIG. 4 is a diagram of an example use of a logging tool in a well system.

Neutron activation measurement techniques may be used to evaluate various properties of a subterranean well structure. For instance, referring to FIG. 4, a logging tool 102 (shown in simplified form with only a gamma detector 208 and neutron source 214) can be positioned within a wellbore 104, such that neutrons 402 generated by neutron source 214 are directed towards well structure 100. In response to the neutrons 402, well structure 100 emits gamma rays 406. A portion of the gamma rays 406 can be detected by gamma detector 208. In some implementations, based on the arrival time of each particular gamma ray 406 and/or its energy, gamma rays 406 can be identified as inelastic gamma rays, prompt gamma rays, or delayed gamma rays.

To enhance the well structure 100's response to neutron activation, well structure 100 can be constructed of materials that include one or more doping materials. For instance, during the preparation of construction materials for well structure 100, the construction materials can be doped with a particular amount of a doping material. These doped construction materials can be subsequently used to construct particular structures of well structure 100, in order to provide a desired neutron activation behavior to these structures. As an example, a particular amount of a doping material can be mixed into a concrete slurry, and the doped concrete slurry can be applied to wellbore 104 during the construction a portion of well structure 100. During or after construction, logging tool 102 can be lowered into wellbore 104 and used to analyze the doped portions of well structure 100.

These doping materials can be selected such that they are more likely to be activated by neutrons (e.g., have an absorption cross section higher than that of the background), emit gamma rays within a known period of time, and emit gamma rays at known discrete energy levels after neutron activation. The inclusion of these doping materials can increase the number of gamma rays that are emitted when neutrons are directed into the well structure, and these emitted gamma rays can be more easily identified based on their emission time and energy level.

In some implementations, a well structure 100 can be constructed with materials that are typically used for the construction of a well that are doped with an appropriate doping material. Construction materials can be any material placed between the casing and the wellbore to seal the annulus and provide zonal isolation. Example materials include traditional cement (e.g., Portland cement), other cementitious materials (e.g., pozzolans, ultrafine cements, epoxy cements, slag cements, and so forth), foamed cements, resins, and so forth. In an example, a cement slurry can be mixed with a doping material that includes Vanadium-51. Vanadium-51 has a 4.88 barn activation cross section, and after neutron activation, emits 1.4 MeV gamma rays as it decays with a half-life of approximately 3.74 minutes. Doping materials can be selected based one or more criteria. For example, in some implementations, doping materials can be selected based on their activation cross section in order to specify a desired probability for neutron activation and subsequent emission of activation gamma rays. In some implementations, doping materials can be selected based on the gamma decay half-life of its neutron activated isotope in order to specify a desired period of time in which activation gamma rays are emitted. In some implementations, doping materials can be selected based on their gamma ray emission energy level in order to specify a desired energy level of the emitted gamma rays.

Various combinations of the construction material and the doping material can be used. For example, in some implementations, a microgram of Vanadium-51 can be used per gram of cement slurry. In this example, the number of gamma rays emitted by the well structure is substantially increased (e.g., on the order of $10^4$ counts per second (cps)), and is significantly higher than the number of gamma rays emitted by the background (e.g., on the order of $10^2$ cps, or less).

In some implementations, other doping materials can be used (e.g., isotopes of Indium or other materials with an activation cross section, activation gamma ray emission energy level, and gamma decay half-time suitable for a particular application), either additionally or alternatively to Vanadium-51. Further, varying combinations of the construction material and doping material can be used. For example, in some implementations, the ratio between the doping material and the construction material can range from ratios on the order of micrograms per gram, to ratios on the order of several centigrams per gram.

In some implementations, doping materials can be used selectively on particular portions of the well structure, such that the number of gamma rays emitted from a particular structure is increased, and so that gamma rays emitted from these structures can be more easily identified. In an example, referring to FIG. 4, a well structure 100 can include multiple structures, such a casing 404, and multiple other layers 408 and 412. These structures can be made of similar, or of different materials. For instance, in some implementations, casing 404 is composed of steel, titanium, or fiberglass, while layers 408 and 412 are composed of concrete. In order to more easily identify gamma rays emitted from layer 408 from gamma rays emitted from other structures, layer 408 can include doping materials, such that layer 408 emits significantly more gamma rays 406 than another other portion of well 100 (e.g., casing 404 or layer 412) or the background 410, and so that the gamma rays 406 emitted by layer 408 are of a particular energy level. In some implementations, all of the gamma rays 406 that are detected by gamma detector 208 are assumed to be emitted from the doped portion of the well structure. In other implementations, in order to isolate gamma rays emitted by the doped portion of the well structure, only gamma rays 406 with an energy level corresponding to the doping material are counted.

In some cases, the number of gamma rays that are emitted in response to the neutron activation is dependent on the mass of the well structure exposed to the neutron flux. Thus, in some implementations, various properties of the well structure can be determined by the number of gamma rays 406 detected by gamma detector 208. For example, a relationship can be determined that relates the number of gamma rays detected by the gamma detector (i.e., the detected activation gamma ray count) to the mass of the portion of the well structure that was exposed to the neutron flux. Thus, the detected activation gamma ray count can be used to estimate the mass of a particular portion of the well structure. As an example, referring to FIG. 4, the number of gamma rays 406 detected by gamma detector 208 can be used to estimate the mass of the portion of layer 408 that was subjected to the neutron flux 402. This relationship can be determined empirically (e.g., based on experimental data obtained from known samples) and/or theoretically (e.g., based on theoretically expected activation gamma ray counts for a given set of materials). This estimate can be based on all of the detected gamma rays, or only a subset of the detected gamma rays. For example, an estimate can be based on only inelastic gamma rays, prompt gamma rays, or delayed gamma rays, or a combination to two types of gamma rays. In another example, an estimate can be based on only gamma rays of a particular energy level.

In some cases, if the well structure is constructed of a material with a known density, a relationship can be determined that relates the number of gamma rays detected by the gamma detector to the density of the portion of the well structure that was exposed to the neutron flux. Thus, the number of detected gamma rays can be measured in order to determine the thickness of a particular portion of the well structure. As an example, referring to FIG. 4, the number of gamma rays 406 detected by gamma detector 208 can be used to estimate the thickness of the portion of layer 408 that was subjected to the neutron flux 402. This relationship also can be determined empirically and/or theoretically. Likewise, this estimate can be based on all of the detected gamma rays, or only a subset of the detected gamma rays.

In some implementations, the mass and/or thickness of the neutron-exposed well structure can be estimated by comparing the detected activation gamma ray count to the expected activation gamma ray count for a given material of a presumed thickness, mass and/or density. For example, if a well structure is known to be made of a particular type of material, and is presumed to have a certain thickness and mass, the expected activation gamma rays can be estimated (e.g., based empirical or theoretical calculations). In an example, the expected number of activation gamma rays can be estimated by multiplying the measured thickness of a portion of a well structure (e.g., as measured by a caliper tool) by the activation strength per unit thickness of a doped cement. If the actual detected activation gamma ray count is greater than the expected activation gamma ray count, the well structure can be estimated as having a greater mass and/or thickness than expected. Likewise, if the actual detected activation gamma ray count is less than the expected activation gamma ray count, the well structure can be estimated as having a smaller mass and/or thickness than expected. As before, this estimate can be based on all of the detected gamma rays, or only a subset of the detected gamma rays.

In some implementations, the relationship between a well structure's mass and/or thickness is proportional to the number of gamma rays that it emits upon neutron activation. Accordingly, in some implementations, the mass and/or thickness of a well structure can be estimated by calculating a ratio between the detected activation gamma ray count and the expected activation gamma ray count. In these implementations, this ratio corresponds to the deviation of the well structure 100 from its expected mass and/or thickness. In some implementations, the relationship between a well structure's mass and/or thickness is linearly proportional to the number of gamma rays that it emits upon neutron activation. Accordingly, in some implementations, the ratio between the detected activation gamma ray count and the expected activation gamma ray count can be multiplied by the presumed mass and/or thickness in order to provide an estimate of the mass or thickness of the well structure. As before, this estimate can be based on all of the detected gamma rays, or only a subset of the detected gamma rays.

The resolution of a mass or thickness estimate can depend on various factors. For instance, the resolution of a thickness estimate can depend on the thickness of the well structure, the type of doping material used, and the amount of the doping material used, among other factors. In an example, for a well structure that is constructed using a cement slurry composed of a microgram of Vanadium-51 per gram of cement slurry, the number of gamma rays emitted by the well structure may be approximately 100 times greater than the number of gamma rays emitted by the background (e.g., $10^4$ cps vs. a background of $10^2$ cps). In this example, differences of 1/30 of the cement thickness may be quantified. Thus, for cement thickness on the order of a centimeter, thickness estimates may be effective for sub-millimeter sized scale. The resolution of the estimates can be increased by increasing the concentration of the doping material relative to the construction material, or by using a doping material with a greater likelihood for neutron activation (e.g., a material with a higher absorption cross section). For example, in some implementations, doping materials can be combined with construction materials at ratios on the order of micrograms per gram, to ratios on the order of several centigrams per gram. Ratios can be selected based on desired resolution of the thickness estimates and the structural requirements of the well structure.

Figure 5:
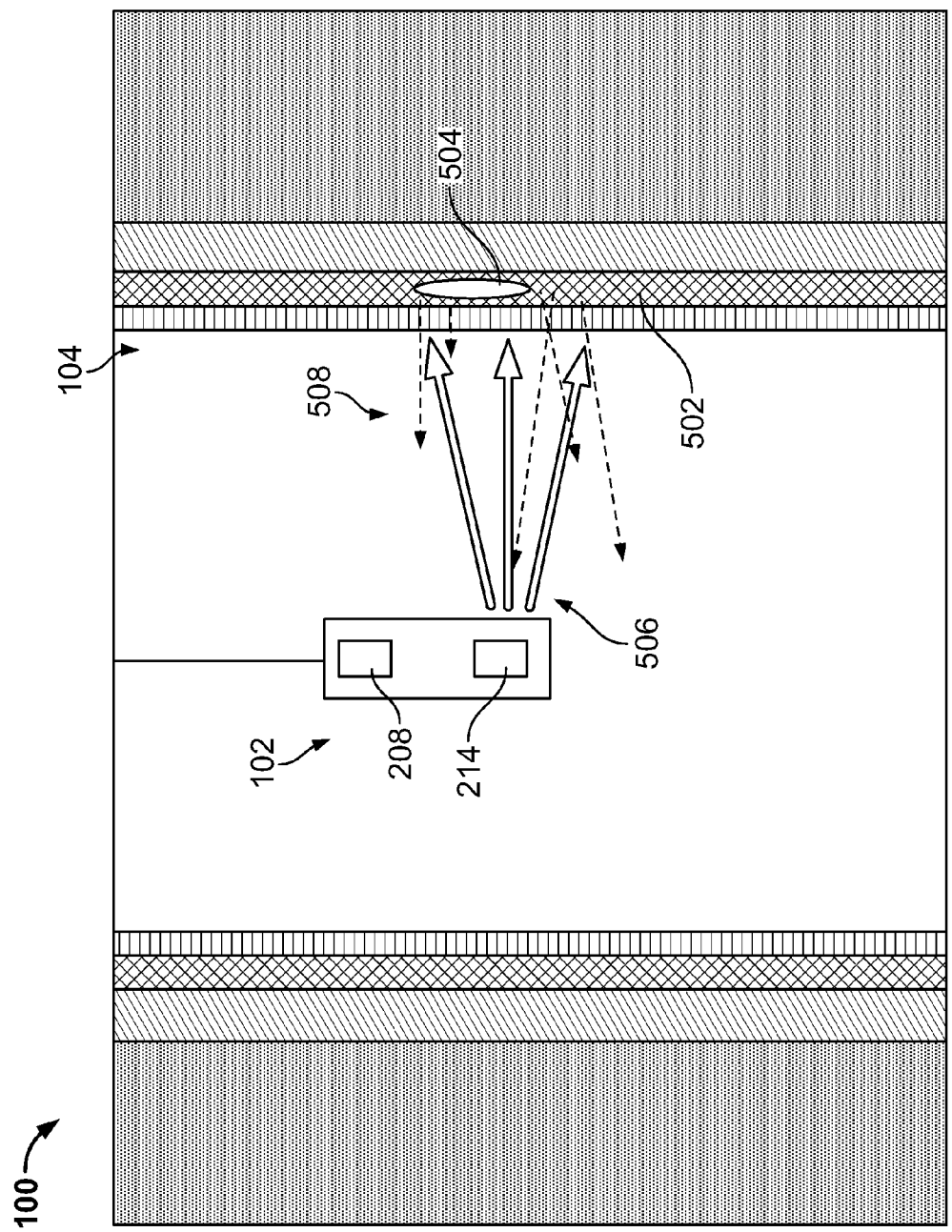
FIG. 5 is a diagram of an example use of a logging tool in a well system having a channel.

In some implementations, neutron activation measurement can be used to identify structural flaws in a well structure. For example, well structures may contain channels formed by air gaps, fluid gaps, or any other discontinuities to the structure that were inadvertently introduced during or after construction. Neutron activation can be used to identify these channels. For example, referring to FIG. 5, a well structure 100 has a layer 502 doped with a doping material. Layer 502 includes a channel 504. As channel 504 does not contain any doping materials, channel 504 emits significantly fewer gamma rays in response to neutron flux. Thus, when logging tool 102 is positioned in proximity to channel 504, and neutron source 214 emits neutrons 506 towards layer 502 and channel 504, fewer gamma rays 508 are emitted than had the channel 504 not been present. As a result, fewer gamma rays 508 are detected by gamma detector 208.

This reduction in the number of detected gamma rays can be used to identify the location of channel 504. For example, in some implementations, logging tool 102 can be used to continuously or periodically conduct measurements as it descends within wellbore 104. As layer 502 has a relatively uniform thickness, the measured number of gamma rays may be relatively constant. As logging tool 102 moves into proximity with channel 504, the measured number of gamma rays decreases. And as logging tool 102 moves away from channel 504, the measured number of gamma rays increases again back to its original value. Thus, by identifying the location at which the detected number of gamma rays decreased, the location of channel 504 can be identified.

In some implementations, flaws such as channel 504 can be identified even if layer 502 is not of a constant thickness/mass. For example, in some implementations, layer 502 may be of different presumed thicknesses along different locations of the well structure 100. As logging tool 102 descends within wellbore 104 and conducts measurements, the detected activation gamma ray count can be compared to the expected activation gamma ray count for a given location and its presumed thickness. A ratio can be calculated between the detected activation gamma ray count and the expected activation gamma ray count, and channel 504 can be identified by identifying decreases in this ratio. In some implementations, the spatial dimensions of channel 504 can also be estimated based on this ratio.

Figure 6:
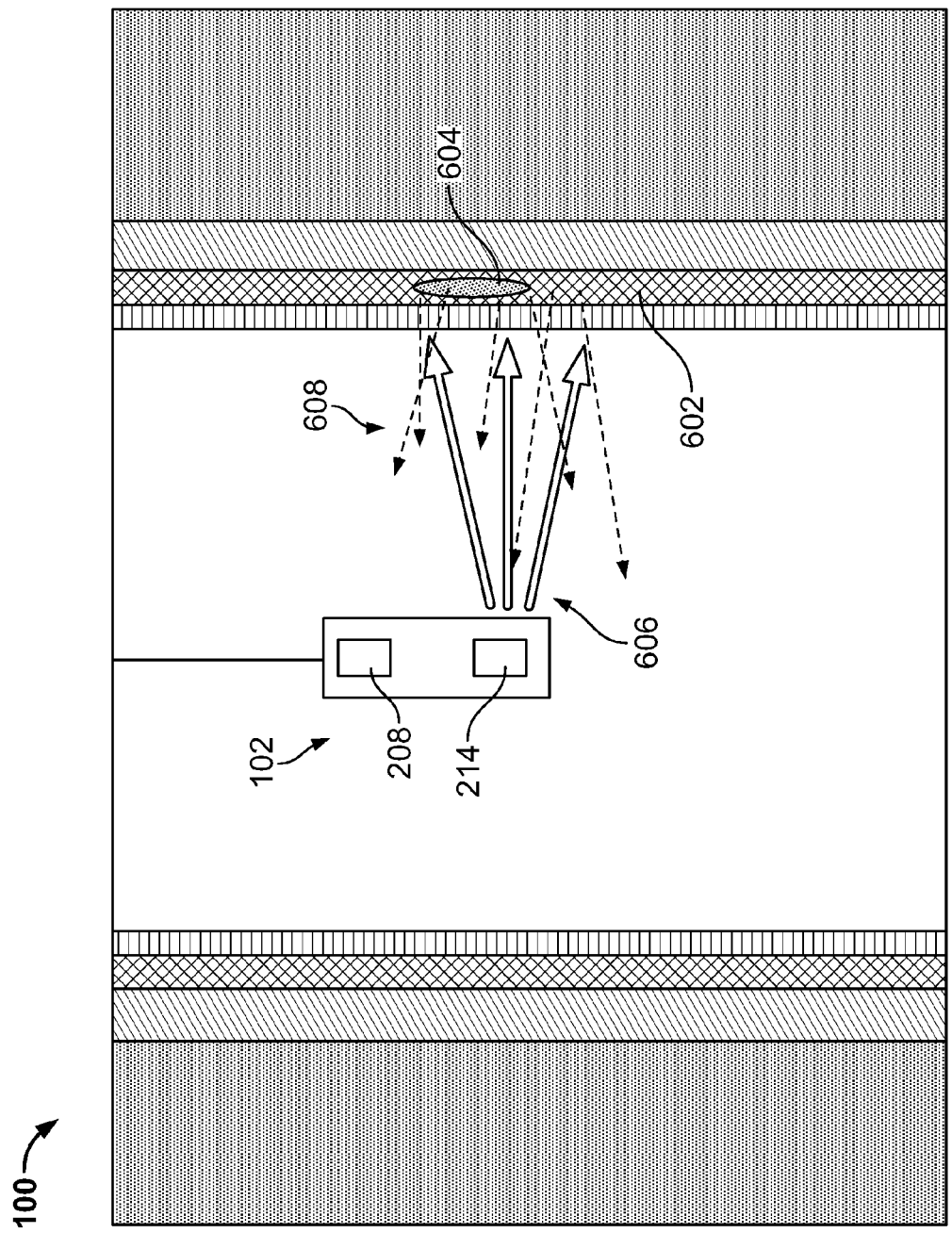
FIG. 6 is a diagram of an example use of a logging tool in a well system having an impurity.

In some implementations, neutron activation measurement can be used to identify other flaws. For example, well structures may contain regions with impurities (e.g., regions were the materials used to construct the well structure are fully or partially displaced by contaminants). Neutron activation can be used to identify these contaminated regions. For example, referring to FIG. 6, a well structure 100 has a layer 602 doped with a doping material. Layer 602 includes a region of impurity 604, containing contaminants that displace the construction material and reduce the local concentration of the doping material. As region 604 contains a lower concentration doping materials, region 604 emits fewer gamma rays in response to neutron flux than rest of layer 602. Thus, when logging tool 102 is positioned in proximity to region 604 and neutron source 214 emits neutrons 606 towards layer 602 and region 604, fewer gamma rays 608 are emitted than had the region 604 not been present. As a result, fewer gamma rays 608 are detected by gamma detector 208. In a similar manner as described above, the logging tool 102 can be used to continuously or periodically conduct measurements as it descends within wellbore 104, in order to locate contaminated regions in layers of constant or varying thicknesses.

Figure 7:
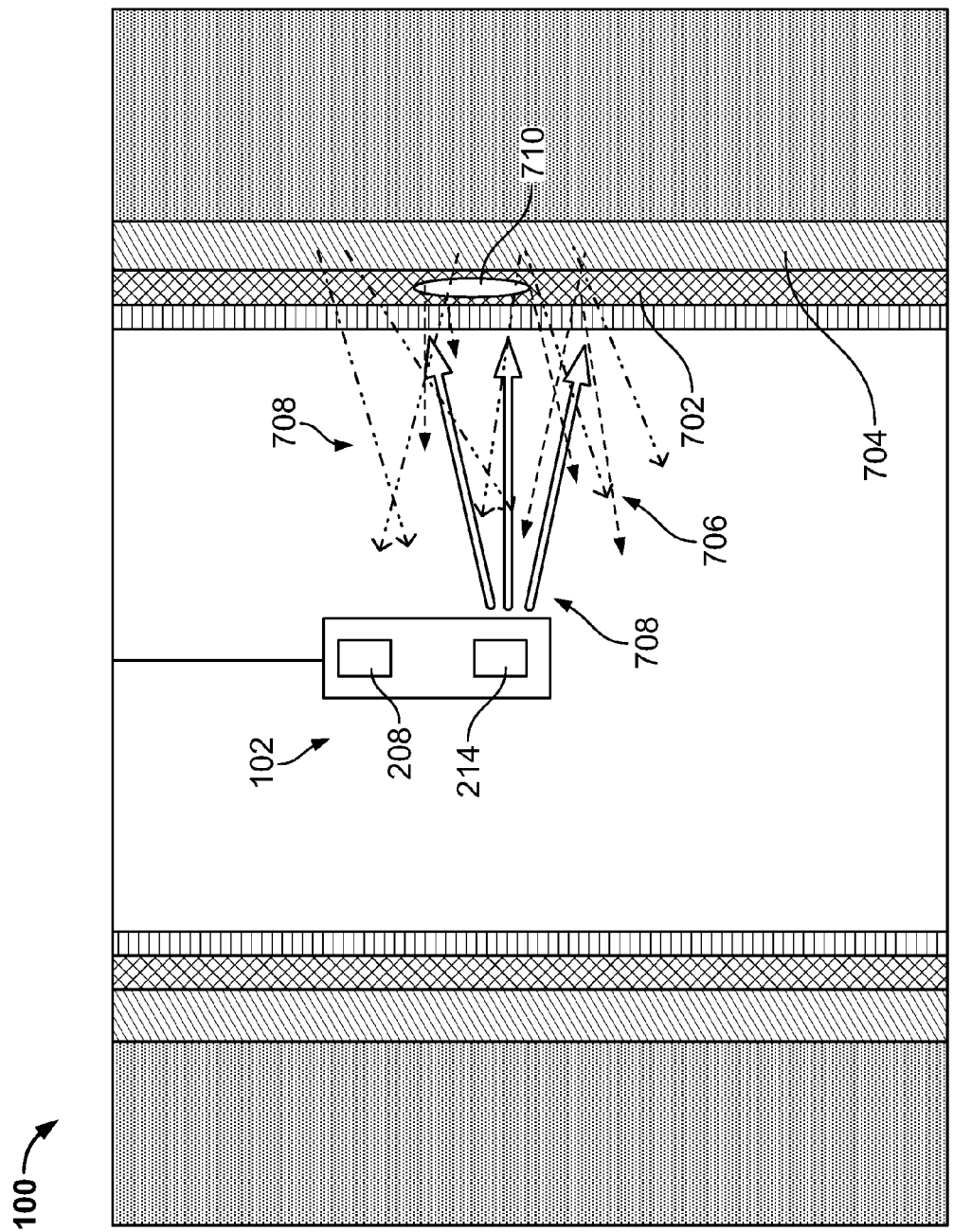
FIG. 7 is a diagram of an example use of a logging tool in a well system to simultaneously obtain information regarding multiple portions of a well system.

In some implementations, different portions of the well structure can be constructed using materials that are doped with different doping materials. If the different doping materials each emit gamma rays at different discrete energy levels after neutron activation, gamma rays from emitted by one well structure can be distinguished by gamma rays emitted by another well structure based on their detected energy level. Referring to FIG. 7, an example well structure 100 includes a first layer 702 doped with a first doping material, and a second layer 704 doped with a second doping material. In response to neutron flux, the first layer 702 will emit gamma rays 706 at a first energy level, and second layer 704 will emit gamma rays 708 at a second energy level. The number of detected gamma rays 706 and 708 emitted by each layer 702 and 704, respectively, can be determined by separating the detected gamma rays based on their energy levels.

In this example, layer 702 includes a channel 710. As channel 710 does not contain any doping materials, channel 710 emits significantly fewer gamma rays 706 in response to neutron flux. However, layer 704 does not contain any channels, and emits the expected number of gamma rays 708 in response to neutron flux. Thus, when logging tool 102 is positioned in proximity to channel 706 and neutron source 214 emits neutrons 708 towards layers 702 and 704 and channel 710, fewer gamma rays 706 are emitted than had the channel 710 not been present. As a result, fewer gamma rays 508 are detected by gamma detector 208. However, the expected number of gamma rays 708 are emitted by the layer 704 and detected by the gamma detector 208. In this manner, by doping different portions of well structure 100 with different doping materials, information can be obtained regarding multiple portions of well structure 100 simultaneously.

In some implementations, the logging tool 102 can be moved through the wellbore 104, either at a constant velocity or intermittently. For example, referring to FIG. 8, logging tool 102 can be moved up or down the wellbore 104 at a velocity v, either constantly or intermittently. In some implementations, logging tool 102 can be moved in a direction substantially parallel to the extension of the wellbore 104. Logging tool 102 can be moved in various ways. For instance, in some implementations, logging tool 102 can positioned one the end of a cable (e.g., the cable 134), and the cable can be positioned over a wellbore using a winch. Logging tool 102 can be lowered or raise by a motor (e.g., an electric motor, gasoline engine, hydraulic motor, or other type of motor) or actuator attached to the other end of the cable. This motor or actuator can be mounted on or near the surface 106 (e.g., on the surface 106, on drilling rig 142, or on derrick 132, or on other components of surface equipment 112).

The velocity v of the logging tool 102 can be selected based on several factors. For example, in some implementations, velocity v is selected based on the distance d between the gamma detector 208 and the neutron source 214 and on the half-life $t_{half}$ of the gamma decay for the doping material used during well construction. In an example implementation, the velocity v of the logging tool 102 can be:

$$v = \frac{d * C}{t_{half}},$$

where C is a scaling factor. In some implementations, the velocity can be selected to optimize the detection count rate of the logging tool based on a given doping material and the physical dimensions of the logging tool and its components. For example, in some implementations, C can be approximately 0.693. In some implementations, the velocity of the logging tool 102 can range from approximately 1 foot per minute to 60 feet per minute, depending on the implementation (e.g., depending on the distance between the gamma detector 208 and the neutron source 214, the half-life of the gamma decay for the doping material used during well construction, or the selected constant value).

In some implementations, the velocity can vary at various points before, during, or after logging operations. In an example, the logging tool can move at a first velocity prior to conducting measurements, move at a second velocity while conducting a series of measurements, pause after conducting the series of measurements, move at a third velocity while conducting another series of measurements, and move at a fourth velocity after conducting the measurements.

One or more of the described implementations provide one or more benefits. For example, some implementations are relatively insensitive to the presence of drilling mud, and measurements obtained by the logging tool may be relatively consistent in a wide range of wellbore environments.

Some implementations are relatively insensitive to microanuuli within the well structure, which often do not affect the zonal isolation of a well structure. Thus, some implementations can be used to specifically look for channels, impurities, and other flaws that may directly affect zonal isolation.

Some implementations can be used at depths just below the surface to approximately 10,000 feet or beyond, and allow for the measurement of a well structure's characteristics at the interface between the well structure and the surrounding subterranean region.

The techniques described above can be implemented in digital electronic circuitry, or in computer software, firmware, or hardware, including the structures disclosed in this specification and their structural equivalents, or in combinations of one or more of them. For example, computing subsystem 110, computer system 210, and processor 222 can include an electronic processor that can be used to control one or more components of well system 100 or logging tool 102. In another example, an electronic processor can be used to analyze and process measurement data obtained by logging tool 102, for instance to estimate a characteristic of subsurface layers 122 or structures of well system 100, as described above.

The term "electronic processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Various aspects of the invention may be summarized as follows.

In general, in an aspect, a method for monitoring a subterranean well structure at least partially composed of a first doping material includes moving a logging tool in the subterranean well structure, emitting neutrons towards the subterranean well structure at least partially composed of a first doping material, detecting and counting activation gamma rays emitted by the subterranean well structure in response to the neutrons, determining a ratio between the counted number of detected activation gamma rays and an expected number of detected activation gamma rays, and determining information corresponding to a characteristic of the well structure based on the ratio. The logging tool is moved relative to the subterranean well structure at a velocity that depends on a distance between a neutron source and a gamma ray detector of the logging tool, and a gamma decay half-life corresponding to the first doping material.

Implementations of this aspect may include one or more of the following features:

In some implementations, the first doping material can be vanadium.

In some implementations, the logging tool can be coupled to a logging string comprising one or more other tools.

In some implementations, the velocity of the logging tool relative to the well structure can be proportional to the distance between the neutron source and the gamma ray detector. The velocity of the logging tool relative to the well structure can be inversely proportional to the gamma decay half-life corresponding to the first doping material. The velocity can be approximately 0.693 multiplied by the distance between the neutron source and the gamma ray detector, divided by the gamma decay half-life corresponding to the first doping material.

In some implementations, the first doping material can be characterized by a neutron activation cross section that is greater than a neutron activation cross section of a medium that at least partially surrounds the structure. The medium can be concrete. The medium can be a subterranean formation.

In some implementations, the well structure can include at least two different portions. A first portion can be at least partially composed of the first doping material. A second portion can be at least partially composed of a second doping material different from first doping material. The doping material can be characterized by a second activation gamma ray energy level that is different than an activation gamma ray energy level of the first doping material. Determining information corresponding to the characteristic of the well structure can include determining information corresponding to a characteristic of the first portion and determining information corresponding to a characteristic of the second portion. Determining information corresponding to a characteristic of the first portion includes determining a ratio between the counted number of detected activation gamma rays and the expected number of detected activation gamma rays for the activation gamma ray energy level of the first doping material. Determining information corresponding to a characteristic of the second portion can include determining a ratio between the counted number of detected activation gamma rays and the expected number of detected activation gamma rays for the second activation gamma ray energy level.

In some implementations, the method further includes preparing a first substance for constructing the well structure by combining cement and the first doping material, and forming the well structure using the first substance. Combining cement and the first doping material can include combining cement and the first doping material at a pre-determined ratio. The method can further include preparing a second substance for constructing the well structure by combining cement and the second doping material, and forming the well structure by further using the second substance.

In some implementations, the characteristic can be a thickness of a portion of the well structure. In some implementations, the characteristic can be a mass of a portion of the well structure. In some implementations, the characteristic can be a location of a channel in a portion of the well structure.

In general, in another aspect, a system for monitoring a subterranean well structure at least partially composed of a first doping material includes a logging tool at least partially within the subterranean well structure, the logging tool including a neutron source and a gamma ray detector. The system also includes a motor coupled to the logging tool that moves the logging tool relative to the well structure at a velocity that depends on a distance between the neutron source and the gamma ray detector, and a gamma decay half-life corresponding to the first doping material. The system also includes a data processing apparatus communicably coupled to the gamma ray detector, the data processing apparatus including a processor and a memory device coupled to the processor, the memory device containing a set of instructions that, when executed by the processor, cause the processor to receive a counted number of activation gamma rays, determine a ratio between the counted number of detected activation gamma rays and an expected number of detected activation gamma rays, and determine information corresponding to a characteristic of the well structure based on the ratio.

Implementations of this aspect may include one or more of the following features:

In some implementations, the first doping material can be vanadium.

In some implementations, the logging tool can be coupled to a logging string including one or more other tools.

In some implementations, the velocity of the logging tool relative to the well structure can be proportional to the distance between the neutron source and the gamma ray detector. The velocity of the logging tool relative to the well structure can be inversely proportional to the gamma decay half-life corresponding to the first doping material. The velocity can be approximately 0.69 multiplied by the distance between the neutron source and the gamma ray detector, divided by the gamma decay half-life corresponding to the first doping material.

In some implementations, the first doping material can be characterized by a neutron activation cross section that is greater than a neutron activation cross section of a medium that at least partially surrounds the structure. In some implementations, the medium can be concrete. In some implementations, the medium can be a subterranean formation.

In some implementations, the operations further include determining information corresponding to a mass of the well structure based on the ratio.

In some implementations, the well structure includes at least two different portions. A first portion can be at least partially composed of the first doping material. A second portion can be at least partially composed of a doping material different from the first doping material. The doping material can be characterized by a second activation gamma ray energy level that is different than an activation gamma ray energy level of the first doping material. Determining information corresponding to the characteristic of the well structure can include determining information corresponding to a characteristic of the first portion and determining information corresponding to a characteristic of the second portion. Determining information corresponding to a characteristic of the first portion can include determining a ratio between the counted number of detected activation gamma rays and the expected number of detected activation gamma rays for the activation gamma ray energy level of the first doping material. Determining information corresponding to a characteristic of the second portion can include determining a ratio between the counted number of detected activation gamma rays and the expected number of detected activation gamma rays for the second activation gamma ray energy level.

In some implementations, the first portion can be composed of a cement doped with the first doping material.

In some implementations, the characteristic can be a thickness of a portion of the well structure. In some implementations, the characteristic can be a mass of a portion of the well structure. In some implementations, the characteristic can be a location of a channel in a portion of the well structure.

Other implementations are within the scope of the following claims.

What is claimed is:

1. A method for monitoring a subterranean well structure at least partially composed of a first doping material comprising:
    moving a logging tool in the subterranean well structure;
    emitting neutrons towards the subterranean well structure at least partially composed of a first doping material;
    detecting and counting activation gamma rays emitted by the subterranean well structure in response to the neutrons;
    determining, with a processor, a ratio between the counted number of detected activation gamma rays and an expected number of detected activation gamma rays; and
    determining information corresponding to a characteristic of the well structure based on the ratio;
    wherein the logging tool is moved relative to the subterranean well structure at a velocity that depends on:
    a distance between a neutron source and a gamma ray detector of the logging tool; and
    a gamma decay half-life corresponding to the first doping material.

2. The method of claim 1, wherein the first doping material is vanadium.

3. The method of claim 1, wherein the logging tool is coupled to a logging string comprising one or more other tools.

4. The method of claim 1, wherein the velocity of the logging tool relative to the well structure is proportional to the distance between the neutron source and the gamma ray detector.

5. The method of claim 1, wherein the velocity of the logging tool relative to the well structure is inversely proportional to the gamma decay half-life corresponding to the first doping material.

6. The method of claim 1, wherein the velocity is approximately 0.693 multiplied by the distance between the neutron source and the gamma ray detector, divided by the gamma decay half-life corresponding to the first doping material.

7. The method of claim 1, wherein the first doping material is characterized by a neutron activation cross section that is greater than a neutron activation cross section of a medium that at least partially surrounds the structure.

8. The method of claim 7, wherein the medium is concrete.

9. The method of claim 7, wherein the medium is a subterranean formation.

10. The method of claim 1, wherein the well structure comprises at least two different portions, wherein a first portion is at least partially composed of the first doping material, and wherein a second portion is at least partially composed of a second doping material different from the first doping material;
    wherein the doping material is characterized by a second activation gamma ray energy level that is different than an activation gamma ray energy level of the first doping material; and
    wherein determining information corresponding to the characteristic of the well structure comprises determining information corresponding to a characteristic of the first portion and determining information corresponding to a characteristic of the second portion.

11. The method of claim 10, wherein determining information corresponding to a characteristic of the first portion comprises determining a ratio between the counted number of detected activation gamma rays and the expected number of detected activation gamma rays for the activation gamma ray energy level of the first doping material.

12. The method of claim 10, wherein determining information corresponding to a characteristic of the second portion comprises determining a ratio between the counted number of detected activation gamma rays and the expected number of detected activation gamma rays for the second activation gamma ray energy level.

13. The method of claim 1, further comprising:
    preparing a first substance for constructing the well structure by combining cement and the first doping material; and
    forming the well structure using the first substance.

14. The method of claim 13, wherein combining cement and the first doping material comprises combing cement and the first doping material at a pre-determined ratio.

15. The method of claim 13, further comprising:
    preparing a second substance for constructing the well structure by combining cement and a second doping material; and
    forming the well structure by further using the second substance.

16. The method of claim 1, wherein the characteristic is a thickness of a portion of the well structure.

17. The method of claim 1, wherein the characteristic is a mass of a portion of the well structure.

18. The method of claim 1, wherein the characteristic is a location of a channel in a portion of the well structure.

19. A system for monitoring a subterranean well structure at least partially composed of a first doping material, the system comprising:
    a logging tool at least partially within the subterranean well structure, the logging tool comprising a neutron source and a gamma ray detector;
    a motor coupled to the logging tool that moves the logging tool relative to the well structure at a velocity that depends on:

a distance between the neutron source and the gamma ray detector; and a gamma decay half-life corresponding to the first doping material; and a data processing apparatus communicably coupled to the gamma ray detector, the data processing apparatus comprising a processor and a memory device coupled to the processor, the memory device containing a set of instructions that, when executed by the processor, cause the processor to:

receive a counted number of activation gamma rays;

determine a ratio between the counted number of detected activation gamma rays and an expected number of detected activation gamma rays; and determine information corresponding to a characteristic of the well structure based on the ratio.

20. The system of claim 19, wherein the first doping material is vanadium.

21. The system of claim 19, wherein the logging tool is coupled to a logging string comprising one or more other tools.

22. The system of claim 19, wherein the velocity of the logging tool relative to the well structure is proportional to the distance between the neutron source and the gamma ray detector.

23. The system of claim 19, wherein the velocity of the logging tool relative to the well structure is inversely proportional to the gamma decay half-life corresponding to the first doping material.

24. The system of claim 19, wherein the velocity is approximately 0.69 multiplied by the distance between the neutron source and the gamma ray detector, divided by the gamma decay half-life corresponding to the first doping material.

25. The system of claim 19, wherein the first doping material is characterized by a neutron activation cross section that is greater than a neutron activation cross section of a medium that at least partially surrounds the structure.

26. The system of claim 25, wherein the medium is concrete.

27. The system of claim 25, wherein the medium is a subterranean formation.

28. The system of claim 19, the operations further comprising determining information corresponding to a mass of the well structure based on the ratio.

29. The system of claim 19, wherein the well structure comprises at least two different portions, wherein a first portion is at least partially composed of the first doping material, and wherein a second portion is at least partially composed of a second doping material different from the first doping material;

wherein the doping material is characterized by a second activation gamma ray energy level that is different than an activation gamma ray energy level of the first doping material; and wherein determining information corresponding to the characteristic of the well structure comprises determining information corresponding to a characteristic of the first portion and determining information corresponding to a characteristic of the second portion.

30. The system of claim 29, wherein determining information corresponding to a characteristic of the first portion comprises determining a ratio between the counted number of detected activation gamma rays and the expected number of detected activation gamma rays for the activation gamma ray energy level of the first doping material.

31. The system of claim 29, wherein determining information corresponding to a characteristic of the second portion comprises determining a ratio between the counted number of detected activation gamma rays and the expected number of detected activation gamma rays for the second activation gamma ray energy level.

32. The system of claim 19, where a first portion is composed of a cement doped with the first doping material.

33. The system of claim 19, wherein the characteristic is a thickness of a portion of the well structure.

34. The system of claim 19, wherein the characteristic is a mass of a portion of the well structure.

35. The system of claim 19, wherein the characteristic is a location of a channel in a portion of the well structure.

* * * * *